US012228076B2

(12) United States Patent
Snyder et al.

(10) Patent No.: US 12,228,076 B2
(45) Date of Patent: Feb. 18, 2025

(54) STUD FILM COOLING FOR DOUBLE WALL COMBUSTORS

(71) Applicant: Raytheon Technologies Corporation, Farmington, CT (US)

(72) Inventors: Timothy S Snyder, Glastonbury, CT (US); Roger O. Coffey, Glastonbury, CT (US); Lourdes M. Tafur Bermudez, Isabela, PR (US); Ryan Kimball Lundgreen, Provo, UT (US); Dibesh D. Joshi, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/356,109

(22) Filed: Jul. 20, 2023

(65) Prior Publication Data

US 2025/0027449 A1 Jan. 23, 2025

(51) Int. Cl.
*F02C 7/18* (2006.01)
*F23R 3/00* (2006.01)

(52) U.S. Cl.
CPC ............. *F02C 7/18* (2013.01); *F23R 3/002* (2013.01); *F05D 2240/35* (2013.01); *F05D 2260/232* (2013.01)

(58) Field of Classification Search
CPC ......... F02C 7/18; F23R 3/002; F05D 2240/35
See application file for complete search history.

(56) References Cited

U.S. PATENT DOCUMENTS

| 5,775,108 | A  | * | 7/1998 | Ansart | F23R 3/002 |
|           |    |   |        |        | 60/757 |
| 6,513,331 | B1 | * | 2/2003 | Brown | F23R 3/06 |
|           |    |   |        |        | 60/754 |
| 9,625,158 | B2 | * | 4/2017 | Olsen | F23R 3/06 |
| 10,317,080| B2 | * | 6/2019 | Tu, Jr. | F23R 3/002 |
| 10,494,928| B2 | * | 12/2019| Harding | F23R 3/005 |

(Continued)

FOREIGN PATENT DOCUMENTS

| EP | 3156731 | 4/2017 |
| EP | 3361157 | 8/2018 |

(Continued)

OTHER PUBLICATIONS

European Patent Office, European Search Report dated Oct. 25, 2024 in Application No. 24188997.1.

*Primary Examiner* — Lorne E Meade
(74) *Attorney, Agent, or Firm* — SNELL & WILMER L.L.P.

(57) ABSTRACT

A combustor panel is disclosed herein. The combustor panel includes a top side, a bottom side opposite the top side, a feature coupled to the top side and extending orthogonally away from the top side, the feature defining a first space on the bottom side beneath the feature, a first plurality of cooling holes extending in a first direction from the top side to the bottom side, a second plurality of cooling holes extending in a second direction from the top side to the bottom side, the second direction being rotated about 1° to about 60° counter-clockwise from the first direction, and a third plurality of cooling holes extending in a third direction from the top side to the bottom side, the third direction being about rotated 1° to about 60° clockwise from the first direction.

20 Claims, 7 Drawing Sheets

(56) References Cited

U.S. PATENT DOCUMENTS

| | | | |
|---|---|---|---|
| 10,590,779 B2* | 3/2020 | Whitfield | F02C 9/18 |
| 10,927,762 B2 | 2/2021 | Harding et al. | |
| 11,015,529 B2* | 5/2021 | Wertz | F23R 3/005 |
| 11,029,027 B2* | 6/2021 | Lewis | F02K 3/06 |
| 11,199,326 B2* | 12/2021 | Gringhaus | F02C 7/18 |
| 11,434,821 B2 | 9/2022 | Wertz | |
| 2004/0045298 A1 | 3/2004 | Pidcock et al. | |
| 2014/0216042 A1* | 8/2014 | Hanson | F23R 3/06 |
| | | | 60/754 |

FOREIGN PATENT DOCUMENTS

| | | |
|---|---|---|
| EP | 3453965 | 3/2019 |
| EP | 3839348 | 6/2021 |

* cited by examiner

STUD FILM COOLING FOR DOUBLE WALL COMBUSTORS

FIELD

The present disclosure generally relates to gas turbine engines, and more particularly, to heat shield panels used in the combustors of gas turbine engines.

BACKGROUND

A gas turbine engine includes a fan section, a compressor section, a combustor section, and a turbine section. The fan section may drive air along a bypass flowpath while the compressor section may drive air along a core flowpath. In general, during operation, air is pressurized in the compressor and then mixed with fuel and ignited in the combustor to generate combustion gases. The combustion gases flow through the turbine, which extracts energy from the combustion gases to power the compressor and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more shells and one or more panels attached to the shells. Cooling cavities reside between the shells and the panels and fluidly couple impingement apertures extending through the shells with effusion apertures extending through the panels. The effusion apertures are typically configured and arranged to form thin films of cooling air that extend across the inner surfaces of the liners to provide a protective barrier to the harsh conditions existing in the combustor. Dilution holes are also spaced circumferentially about the liner assemblies and serve to provide dilution air from a cooling plenum surrounding the combustor into the combustion chamber to improve emissions and to tailor the temperature profile of combustion gases at the combustor outlet to protect the turbine section from overheating.

SUMMARY

Disclosed herein is a combustor panel including a top side, a bottom side opposite the top side, a feature coupled to the top side and extending orthogonally away from the top side, the feature defining a first space on the bottom side beneath the feature, a first plurality of cooling holes extending in a first direction from the top side to the bottom side, a second plurality of cooling holes extending in a second direction from the top side to the bottom side, the second direction being rotated about 1° to about 60° counter-clockwise from the first direction, and a third plurality of cooling holes extending in a third direction from the top side to the bottom side, the third direction being about rotated 1° to about 60° clockwise from the first direction.

In various embodiments, the first plurality of cooling holes is configured to form a first portion of a cooling film over the bottom side. In various embodiments, the combustor panel further includes a second space on the bottom side that is opposite the feature and is defined by the second plurality of cooling holes and the third plurality of cooling holes, the second plurality of cooling holes and the third plurality of cooling holes being configured to form a second portion of the cooling film over the second space on the bottom side.

In various embodiments, the combustor panel further includes a third space on the bottom side adjacent the first space that is defined by the first portion of the cooling film and the second portion of the cooling film. In various embodiments, the second space is void of cooling holes. In various embodiments, the top side is a cold side and the bottom side is a hot side. In various embodiments, the second plurality of cooling holes is adjacent a first side of the feature and the third plurality of cooling holes is adjacent a second side of the feature, the feature being between the first plurality of cooling holes and the second plurality of cooling holes. In various embodiments, the second plurality of cooling holes is between the first plurality of cooling holes and the feature.

Also disclosed herein is a combustor of a gas turbine engine including a combustion chamber, an outer shell disposed around the combustion chamber, and an inner shell disposed around the combustion chamber and between the combustion chamber and the outer shell. The inner shell includes a top side facing the outer shell, a bottom side facing the combustion chamber, a stud coupled to the top side of the inner shell and extending toward the outer shell, the stud configured to secure the outer shell to the inner shell, a first plurality of cooling holes disposed adjacent a first side of the stud and extending through the inner shell in a first direction that is rotated about 1° to about 45° counter-clockwise from an axial direction, and a second plurality of cooling holes disposed adjacent a second side of the stud and extending through the inner shell in a second direction that is rotated about 1° to about 45° clockwise from the axial direction.

In various embodiments, the inner shell further includes a third plurality of cooling holes extending through the inner shell in the axial direction, wherein the first plurality of cooling holes is disposed between the stud and the third plurality of cooling holes. In various embodiments, the first plurality of cooling holes, the second plurality of cooling holes, and the third plurality of cooling holes are configured to form a cooling film over the bottom side of the inner shell. In various embodiments, the stud defines a space on the bottom side that is void of cooling holes.

In various embodiments, the space defines a void in the cooling film formed by airflow through the first plurality of cooling holes, the second plurality of cooling holes, and the third plurality of cooling holes. In various embodiments, each of the first plurality of cooling holes is rotated counter-clockwise from the axial direction by a different amount. In various embodiments, each of the second plurality of cooling holes is rotated clockwise from the axial direction a different amount.

Also disclosed herein is a gas turbine engine including a fan section, a compressor section adjacent the fan section, and a combustor section adjacent the compressor section. The combustor section includes a combustion chamber, an outer shell disposed around the combustion chamber, and an inner shell disposed around the combustion chamber and between the combustion chamber and the outer shell. The inner shell includes a top side facing the outer shell, a bottom side facing the combustion chamber, a stud coupled to the top side of the inner shell and extending toward the outer shell, the stud configured to secure the outer shell to the inner shell, a first plurality of cooling holes disposed adjacent a first side of the stud and extending through the inner shell in a first direction that is rotated about 1° to about 45° counter-clockwise from an axial direction, and a second plurality of cooling holes disposed adjacent a second side of the stud and extending through the inner shell in a second direction that is rotated about 1° to about 45° clockwise from the axial direction.

In various embodiments, the inner shell further includes a third plurality of cooling holes extending through the inner shell in the axial direction, wherein the first plurality of cooling holes is disposed between the stud and the third plurality of cooling holes. In various embodiments, the first plurality of cooling holes, the second plurality of cooling holes, and the third plurality of cooling holes are configured to form a cooling film over the bottom side of the inner shell.

In various embodiments, each of the first plurality of cooling holes is rotated counter-clockwise from the axial direction by a different amount. In various embodiments, each of the second plurality of cooling holes is rotated clockwise from the axial direction a different amount.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
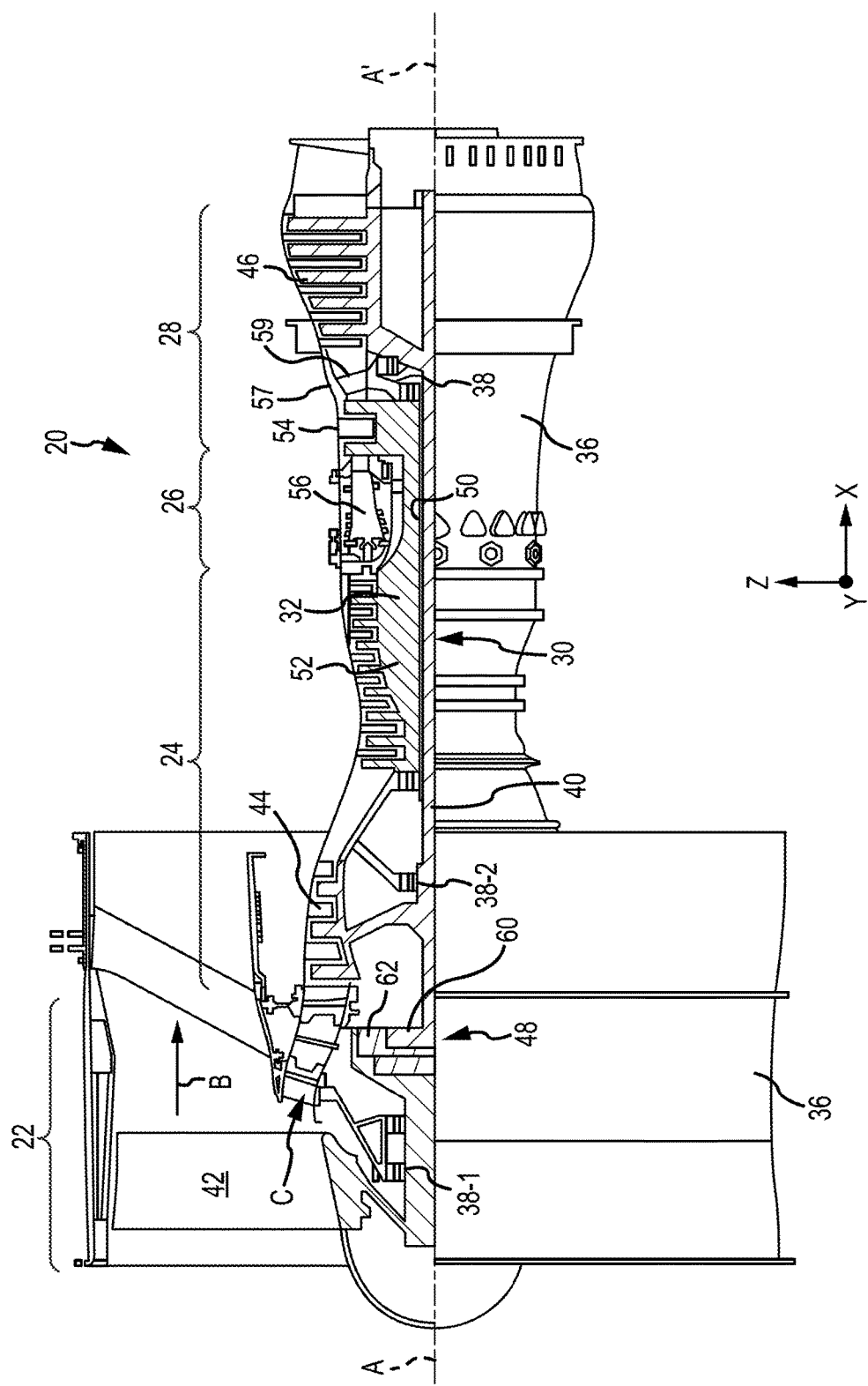
FIG. 1A illustrates a cross sectional schematic view of a gas turbine engine, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed here is a double wall configuration for an outer shell of a gas turbine combustor. The double wall combustors are held together by attaching hot panels with studs to cold shells with a nut so that there is a cold side and a hot side. In various embodiments, a first plurality of effusion cooling holes drilled through the hot panels allow a cooling film to pass from the cold side to the hot side. In various embodiments, a second plurality of effusion cooling holes may be drilled in various patterns around the studs to provide a cooling film around the studs and prevent corrosion of the hot panel around the studs. In various embodiments, the first plurality of effusion cooling holes is pointed in an axial direction of the hot panel. In various embodiments, the second plurality of effusion cooling holes are pointed toward the studs to provide cooling around the studs.

In various embodiments, the first plurality of effusion cooling holes and/or the second plurality of effusion cooling holes may be shaped effusion cooling holes. In various embodiments, the effusion cooling holes may have a circular, an oval, a square, a rectangular, a triangular, a hexagonal, or a pentagonal shape cross section, among others. In various embodiments, the cross section shape may extend the entire length of the effusion cooling holes. In various embodiments, multiple different cross sectional shapes may be used for different sets of effusion cooling holes. In various embodiments, the shaped effusion cooling holes may provide spreading of the cooling film over a wider area, thereby improving the effectiveness of the cooling film. In various embodiments, the second plurality of effusion cooling holes may be twisted off the axial direction, or in a circumferential direction from the axial direction, to direct the cooling film toward the stud. In various embodiments, the second plurality of effusion cooling holes is arranged to build up a cooling film upstream of the stud while tending to minimize the twist of the second plurality of effusion cooling holes. In various embodiments, this results in an improved build up of cooling film upstream and maximizes the cooling film around the stud. In various embodiments, the effusion cooling holes described herein may extend the life of the hot panels and extend the time between maintenance events resulting in lower costs and more time on wing of for the combustor.

It will be appreciated that the effusion cooling holes and their patterns as described herein are not limited to the studs on a hot panel but can be implemented in other areas where cooling may be used under various structural features.

Referring now to FIG. 1A, a gas turbine engine 20 is illustrated, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine section 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

Figure 1B:
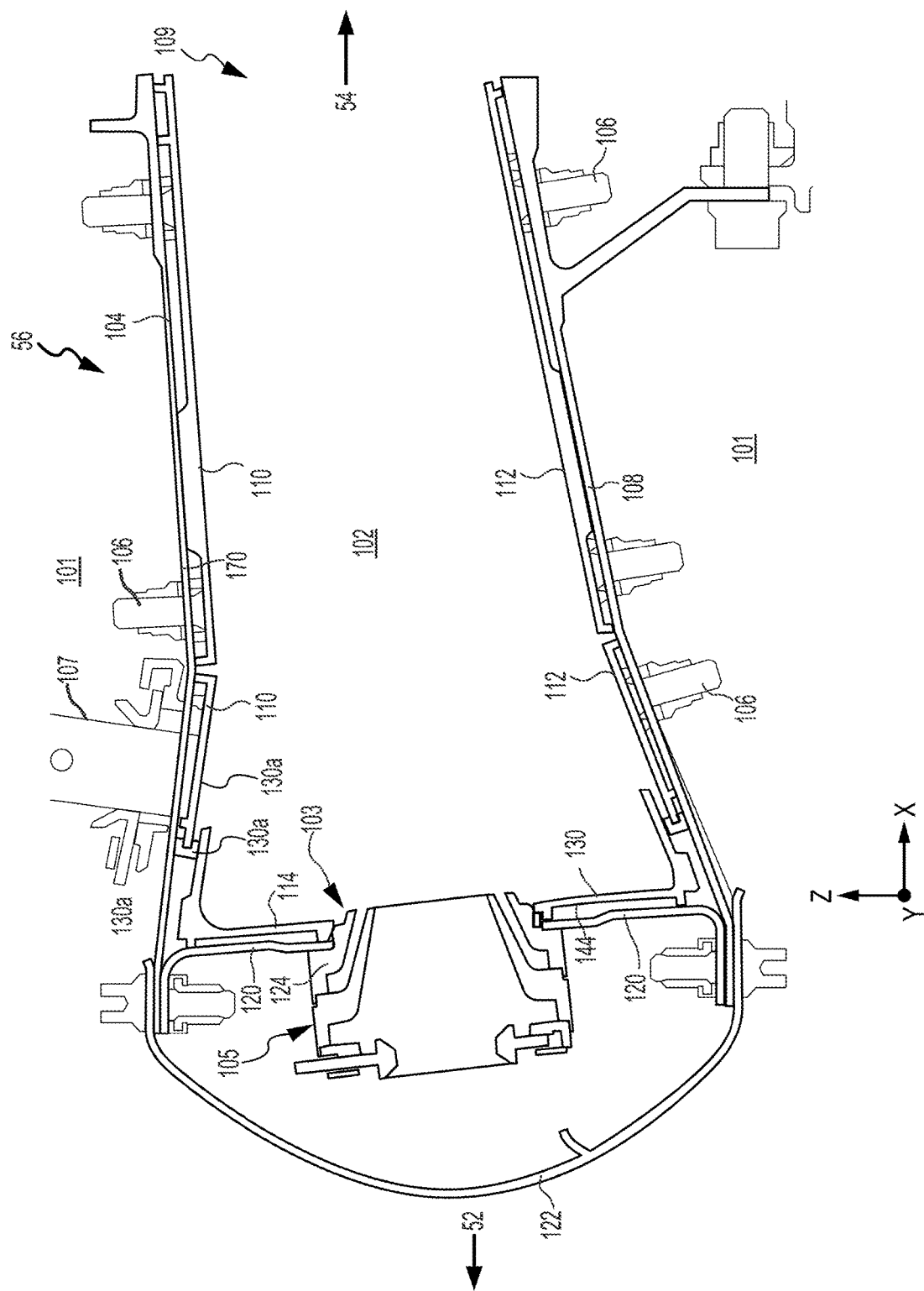
FIG. 1B illustrates a cross sectional schematic view of a combustor section of a gas turbine engine, in accordance with various embodiments.

Referring now to FIG. 1B, a cross-section of combustor 56 positioned between high pressure compressor 52 and high pressure turbine 54 of a gas turbine engine 20 is illustrated, in accordance with various embodiments. Combustor 56 includes a combustion chamber 102 defined by a combustor outer shell 104 and a combustor inner shell 108. Combustor inner shell 108 is radially inward of combustor outer shell 104. Combustor outer shell 104 and combustor inner shell 108 may provide structural support to combustor 56 and its components. Combustor outer shell 104 and combustor inner shell 108 may comprise cylindrical-shaped or conically shaped annular structured located concentrically about engine central longitudinal axis A-A'. A bulkhead shell 120 may be positioned at a forward end of combustion chamber 102. Bulkhead shell 120 extends radially between combustor outer shell 104 and combustor inner shell 108. Combustor 56 further includes an annular hood 122 and a plurality of swirlers 124 (one shown). In various embodiments, hood 122 and bulkhead shell 120 may be coupled to combustor outer shell 104 and combustor inner shell 108. Swirlers 124 may be located through openings defined by bulkhead shell 120.

Combustion chamber 102 may form a region for mixing of air flowing through core flow-path C (with brief reference to FIG. 1A) and fuel. Combustion chamber 102 may be configured to direct the high-speed exhaust gases produced by the ignition of the fuel air mixture inside the combustor 56. The fuel and air mixture may be injected at an inlet 103 of combustion chamber 102 by an axial fuel injection system 105 located the forward end of combustion chamber 102. In various embodiments, combustor 56 may also include one or more radial fuel injectors 107 located through combustor outer shell 104 and/or through combustor inner shell 108. The high-speed exhaust gases may be driven downstream within the combustor 56 towards a combustor outlet 109. Combustor outlet 109 may be located forward of a first vane stage of high pressure turbine 54.

It may be desirable to protect combustor outer shell 104, combustor inner shell 108, and bulkhead shell 120 from the high temperatures, flames, and/or combustion gases within combustion chamber 102. Accordingly, one or more combustor panels (also referred to as thermal shields or combustor liners) may be disposed inside combustion chamber 102 and may provide such thermal protection. In accordance with various embodiments, combustor 56 includes, one or more outer combustor panel(s) 110, one or more inner combustor panel(s) 112, and one or more bulkhead combustor panel(s) 114. Outer combustor panel(s) 110 are located over and/or on an interior surface of combustor outer shell 104. Stated differently, outer combustor panel(s) 110 are located radially inward of combustor outer shell 104. Inner combustor panel(s) 112 are located over and/or on an interior surface of combustor inner shell 108. Stated differently, inner combustor panel(s) 112 are located radially outward of combustor inner shell 108. Bulkhead combustor panel 114 (referred to herein as bulkhead panel 114) is located over and/or on an interior surface of bulkhead shell 120. Stated differently, bulkhead panel 114 is located aft of bulkhead shell 120. As used herein, an "interior surface" refers to a surface of a combustor shell or a combustor panel that is oriented toward the combustion chamber 102, and an "exterior surface" refers to a surface of a combustor shell or a combustor panel that is oriented generally away from the combustion chamber 102 and generally opposite the interior surface.

In various embodiments, fasteners 106 may couple outer combustor panels 110 and inner combustor panels 112 to combustor outer shell 104 and combustor inner shell, respectively. Fasteners 106 may comprise threaded studs, nuts and bolts, clips, rivets, or any other suitable securement mechanism. As described in further detail below, bulkhead panel 114 may be secured in place via spacers outer spacers 130a and inner spacers 130b.

Figure 1C:
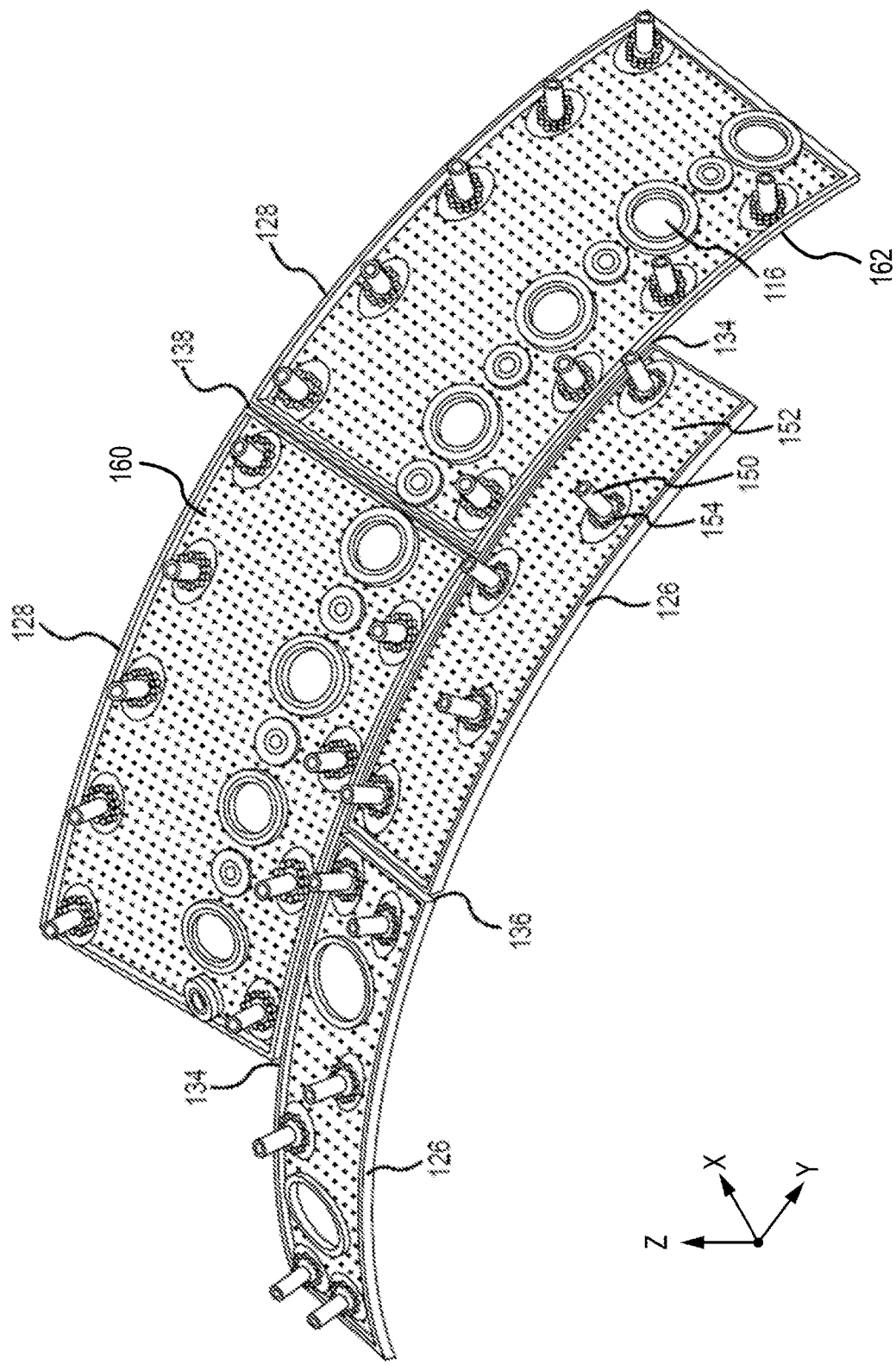
FIG. 1C illustrates a perspective schematic view of a heat shield panel arrangement of a combustor, viewing from the cold side, according to various embodiments.

Turning now to FIG. 1C (with continued reference to FIG. 1B), a first combustor panel 126 and a second combustor panel 128 are illustrated, in accordance with various embodiments. In various embodiments, combustor panels 126, 128 may be examples of outer combustor panels 110 and/or inner combustor panels 112, described above in FIG. 1B. Combustor panels 126, 128 are installed to extend circumferentially around combustion chamber 102. In various embodiments, circumferentially adjacent first combustor panels 126 may form a first axially extending gap 136 between circumferentially adjacent first combustor panels 126. In various embodiments, circumferentially adjacent second combustor panels 128 may form a second axially extending gap 138 between circumferentially adjacent second combustor panels 128. In various embodiments, a first circumferentially extending gap 134 may be formed is also formed between circumferentially adjacent first combustor panels 126 and circumferentially adjacent second combustor panels 128 when positioned axially adjacent one another.

Combustor panels 126, 128 further include dilution holes, or air feed holes, of various dimension, a plurality of orifices 116, a plurality of effusion cooling holes 152 and a shield attachment mechanism, which includes a stud 150 and, in various embodiments, may include a plurality of spacer pins 154. Combustor panels 126, 128 further include a top surface 160 (e.g., in the positive z-direction) and a bottom surface 162 (e.g., in the negative z-direction). Stud 150 extends upward away from top surface 160 (e.g., in the positive z-direction). The plurality of effusion cooling holes 152 extend through combustor panels 126, 128 from top surface 160 to bottom surface 162. While illustrated as being positioned at an angel with respect to one another, in various embodiments, first combustor panel 126 and second combustor panel 128 may be axially inline with each other. That is, first combustor panel 126 and second combustor panel 128 form a cylinder.

Figure 2A:
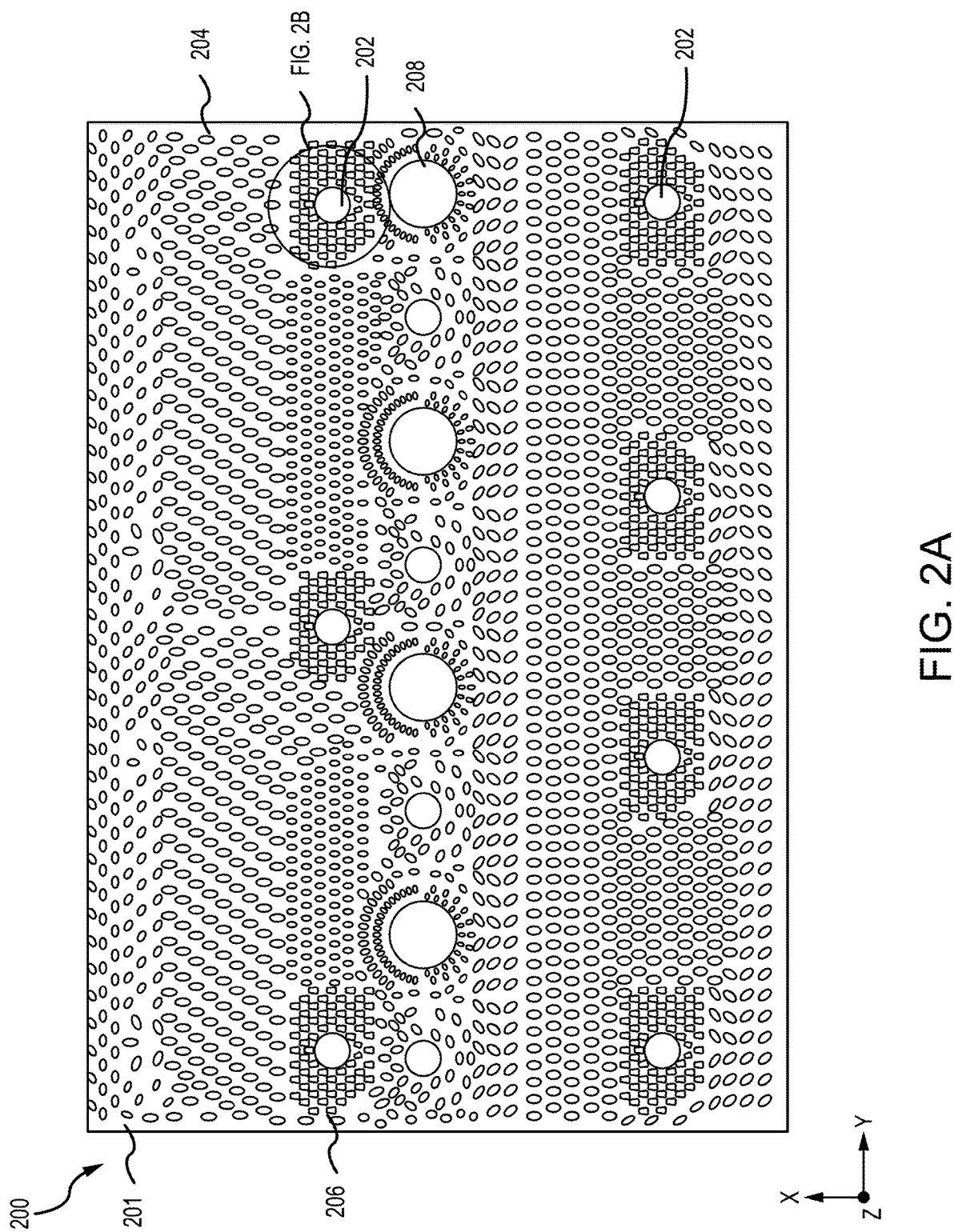
FIG. 2A illustrates a bottom view of a combustor panel used in a combustor section of a gas turbine engine, in accordance with various embodiments.
Figure 2B:
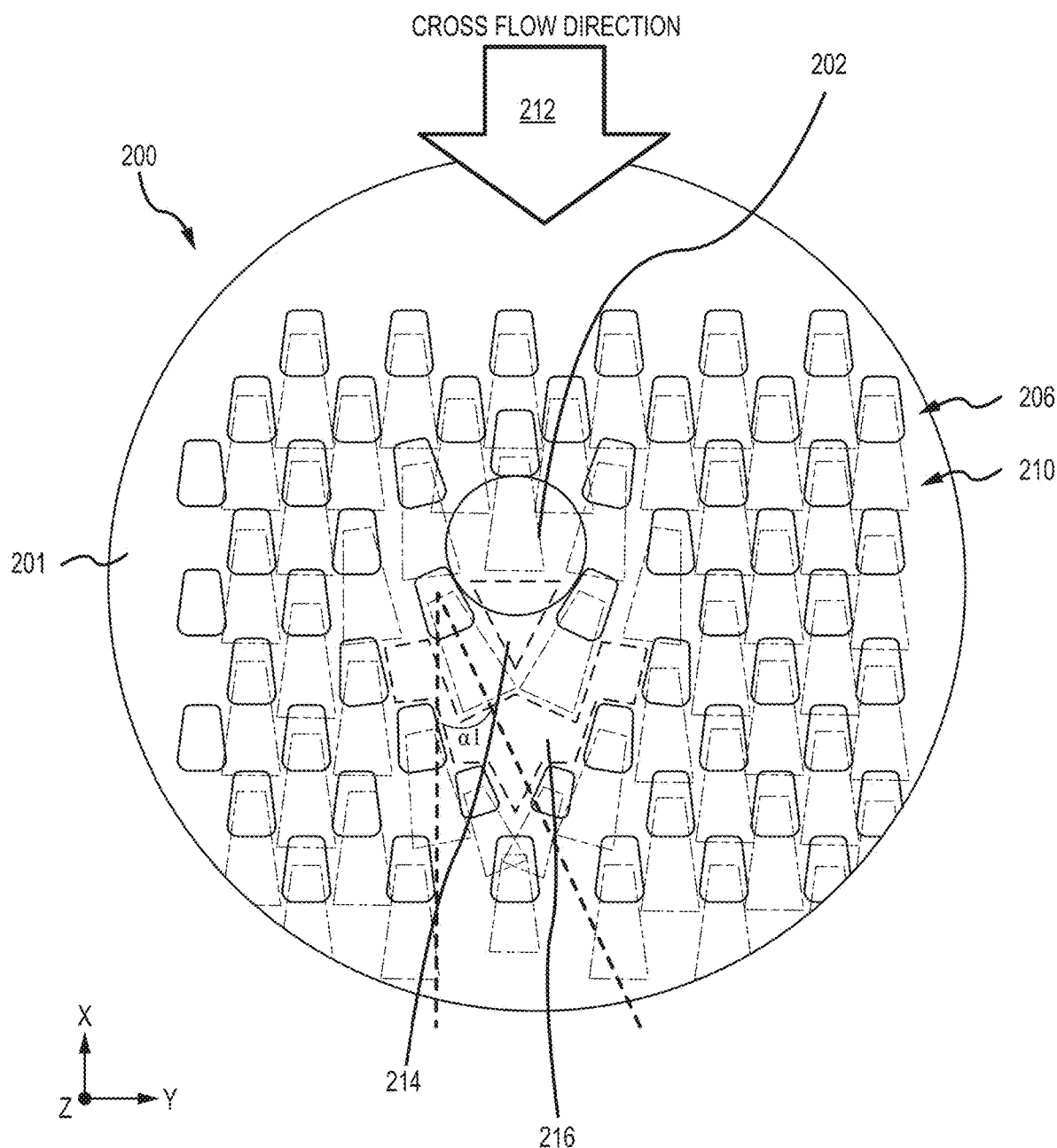
FIG. 2B illustrates a close-up bottom view of a combustor panel including a feature and a plurality of cooling holes, in accordance with various embodiments.
Figure 2C:
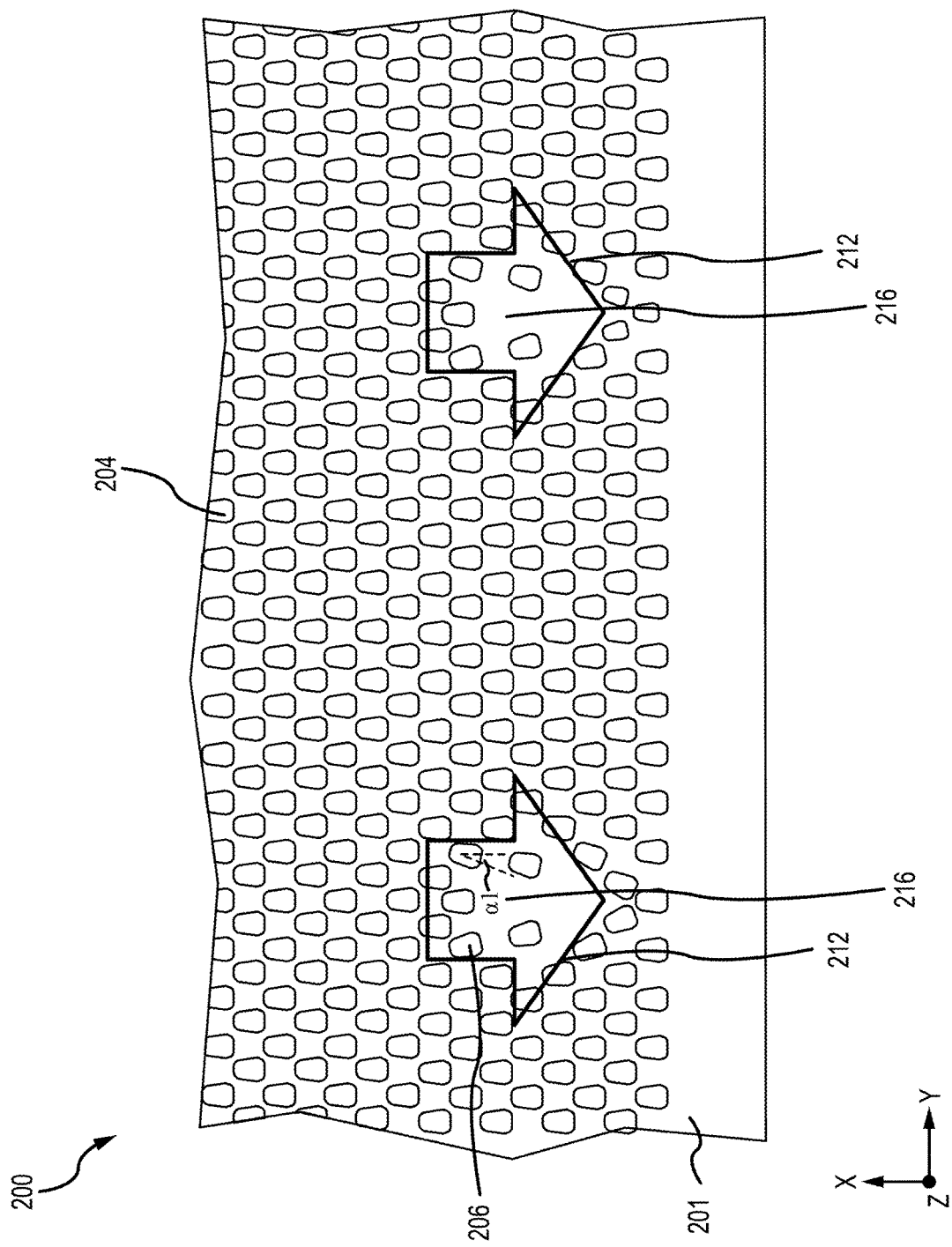
FIG. 2C illustrates a close-up bottom view of a combustor panel including two features and a plurality of cooling holes, in accordance with various embodiments.

Referring now to FIGS. 2A-2C, the underside of a combustor panel 200, also referred to as a hot panel, is illustrated, in accordance with various embodiments. More specifically, a bottom surface 201 of combustor panel (e.g., bottom surface 162) that is opposite stud 150 is illustrated. That is, bottom surface 201 is the surface opposite of the combustor panel that faces combustion chamber 102 of combustor 56 and is opposite the direction that stud 150 extends. In various embodiments, combustor panel 200 may be an example first combustor panel 126 or second combustor panel 128 described above in FIG. 1C. In various embodiments, combustor panel 200 may be an example outer combustor panel(s) 110 or inner combustor panel(s) 112 described above in FIG. 1B. As described above, one or more combustor panels 200 extend circumferentially (e.g., in the y-direction) around combustor 56 and a fluid (e.g., air) flows the axial direction (e.g., in the negative x-direction). Combustor panel 200 includes a plurality of features 202 extending upward (e.g., in the positive z-direction). In various embodiments, features 202 may be an example of fasteners 106 described above in FIG. 1B. Combustor panel 200 further includes a first plurality of effusion cooling holes 204, a second plurality of effusion cooling holes 206, and a plurality of orifices 208.

The first plurality of effusion cooling holes 204 extend from a top surface of combustor panel 200 axially (e.g., in the negative x-direction) and downward (e.g., in the negative z-direction) to introduce a cooling fluid (e.g., air) to bottom surface 201 of combustor panel 200. The cooling fluid forms a cooling film over bottom surface 201 to reduce, or prevent, the burning of combustor panel 200 from the high heat of combustor 56. Typically, the first plurality of effusion cooling holes 204 are formed by drilling through combustor panel 200 from bottom surface 201 to the top surface, upward (e.g., in the positive z-direction) and axially (e.g., in the positive x-direction).

The second plurality of effusion cooling holes 206 are formed adjacent to and around features 202, extending from the top surface to the bottom surface 201. That is, the second plurality of effusion cooling holes 206 extend downward (e.g., in the negative z-direction) from the top surface to the bottom surface and axially (e.g., in the negative x-direction). The second plurality of effusion cooling holes 206 are formed in a similar manner as the first plurality of effusion cooling holes 204. However, features 202 prevent the drilling of the second plurality of effusion cooling holes 206 in the axial direction (e.g., in the positive x-direction) in the way that the first plurality of effusion cooling holes 204 are drilled. This results in a void being formed on bottom surface 201, under feature 202, where no effusion cooling holes are present and the cooling effect is reduced, and in various embodiments, absent.

Referring now to FIG. 2B, a close up of combustor panel 200 including bottom surface 201, the second plurality of effusion cooling holes 206, and feature 202 is illustrated, in accordance with various embodiments. Each of the second plurality of effusion cooling holes 206 provides an amount of air, an airflow 210, from the cooler top surface of combustor panel 200 to the warmer bottom surface 201. A cumulative airflow 212 of the plurality of airflows 210 of the second plurality of effusion cooling holes 206 forms a cooling film over bottom surface 201 of combustor panel 200. As previously stated, feature 202, extending upward (e.g., in the positive z-direction) obstructs the axial positioning of the second plurality of effusion cooling holes 206. Accordingly, various of the second plurality of effusion cooling holes 206 are rotated, or twisted, from the axial direction (e.g., the negative x-direction) toward the circumferentially direction (e.g., the positive or negative y-direction).

That is, each of the second plurality of effusion cooling holes 206 may be twisted from the axial direction (e.g., the x-axis) by an angle $\alpha 1$. A first portion of the second plurality of cooling holes 206 may be twisted in a clockwise direction and a second portion of the second plurality of effusion cooling holes 206 may be twisted in a counter-clockwise direction. In various embodiments, angle $\alpha 1$ may be about −60° to about 60°, and more specifically, about-45° to about 45°, where a negative a1 results in airflow 210 moving in the negative y-direction and a positive a1 results in airflow 210 moving in the positive y-direction. That is, angle $\alpha 1$ may be about 1° to about 60°, and more specifically, about 1° to about 45°, in the clock-wise direction or about 1° to about 60°, and more specifically about 1° to about 45°, in the counter-clockwise direction. As illustrated, and in various embodiments, each of the second plurality of effusion cooling holes 206 may be twisted by a unique a1 to provide better cooling and cumulative airflow 212 across bottom surface 201 adjacent feature 202.

The specific size, shape, and twist of each of the second plurality of effusion cooling holes 206 may be designed to minimize the size of an airflow void 214 along bottom surface 201. Referring momentarily to FIG. 2C, a void 216 on bottom surface 201 due to feature 202 is illustrated, in accordance with various embodiments. While FIGS. 2B and 2C are exemplary representations of bottom surface 201 of combustor panel 200, it will be appreciated by those of skill in the art that void 216 has a larger surface area than airflow void 214. That is, the arrangement of the second plurality of effusion cooling holes 206 provides improved cooling for combustor panel 200 around features 202 than previously possible and achieved. Ultimately, this improvement in cooling results in a longer usable lifespan of each combustor panel 200, less maintenance time and cost, and improved safety due to more time between potential part failures.

Figure 3:
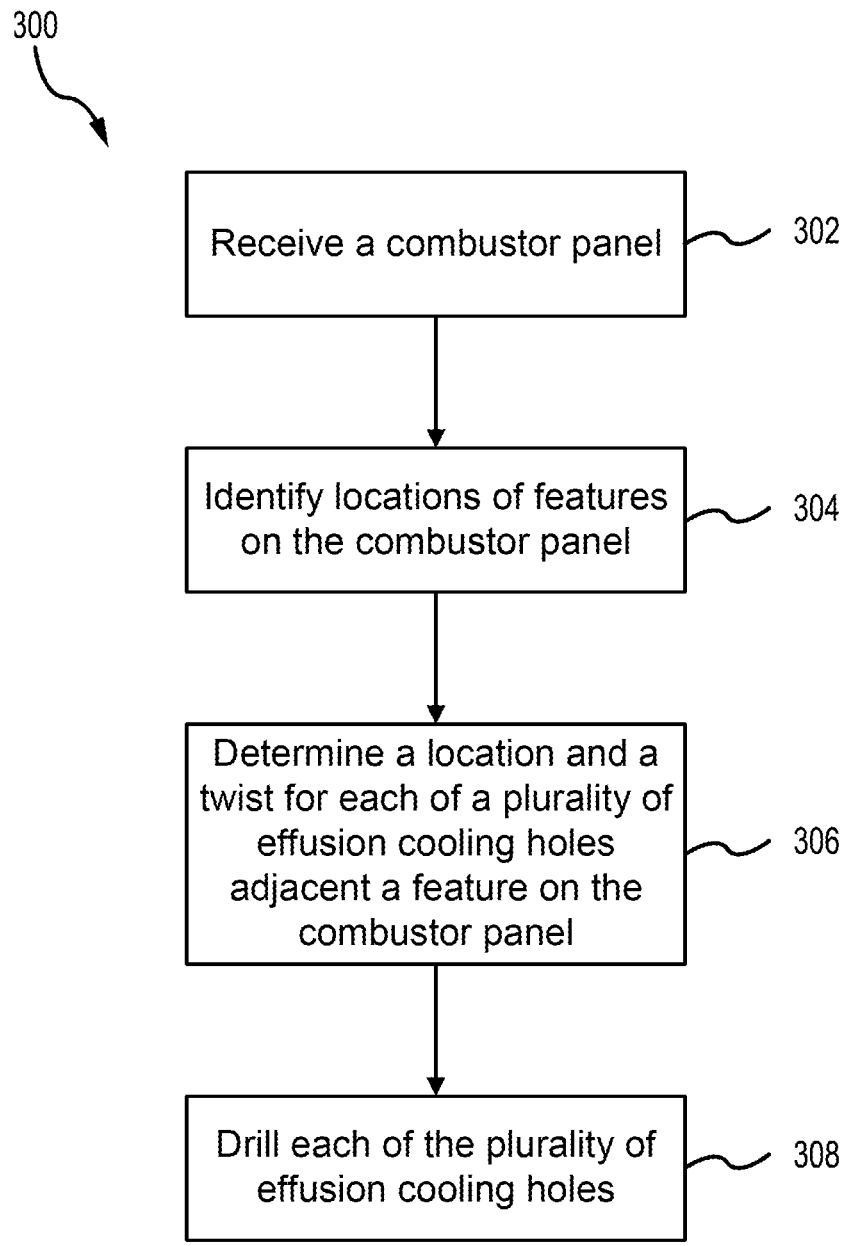
FIG. 3 illustrates a flow diagram of a method of forming a plurality of cooling holes in the combustor panel, in accordance with various embodiments.

Referring now to FIG. 3, a method 300 of forming a plurality of cooling holes in a combustor panel is illustrated, in accordance with various embodiments. At step 302, a combustor panel (e.g., combustor panel 200) including a plurality of features (e.g., feature 202) is received. In various embodiments, the plurality of features 202 may be studs configured to receive and secure a cool side panel in a combustor section of a gas turbine engine. At step 304, the location of each of the plurality of features 202 is identified. At step 306, a location and a twist for each of plurality of effusion cooling holes (e.g., the first and second plurality of effusion cooling holes 204, 206) is determined. In various embodiments, the majority of the plurality of effusion cooling holes may have a twist of 0°, resulting in the airflow moving in the axial direction. The effusion cooling holes that are close to each feature 202 may have a twist that is minimized. That is, the twist of each of the plurality of effusion hole is minimized so that the twist is as close 0° as possible while still maintaining adequate airflow across the hot side of combustor panel 200. At step 308, each of the plurality of effusion cooling holes is drilled. The location and twist of each of the plurality of effusion cooling holes resulting in little to no damage of each feature 202 by the drill.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment, for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A combustor panel, comprising:
    a top side,
    a bottom side opposite the top side,
    a feature coupled to the top side and extending orthogonally away from the top side, the feature defining a first space on the bottom side beneath the feature,
    a first plurality of cooling holes extending in a first direction from the top side to the bottom side,
    a second plurality of cooling holes extending in a second direction from the top side to the bottom side, the second direction being rotated about 1° to about 60° counter-clockwise from the first direction, and
    a third plurality of cooling holes extending in a third direction from the top side to the bottom side, the third direction being about rotated 1° to about 60° clockwise from the first direction, wherein each of the first plurality of cooling holes, the second plurality of cooling holes, and the third plurality of cooling holes has a pentagonal-shaped cross section.

2. The combustor panel of claim 1, wherein the first plurality of cooling holes is configured to form a first portion of a cooling film over the bottom side.

3. The combustor panel of claim 2, further comprising a first void on the bottom side that overlaps at least a portion of the first space and is defined by the second plurality of cooling holes and the third plurality of cooling holes, the second plurality of cooling holes and the third plurality of cooling holes being configured to form a second portion of the cooling film on opposite sides of the first void on the bottom side.

4. The combustor panel of claim 3, further comprising a second void on the bottom side adjacent the first void that is defined by the first portion of the cooling film and the second portion of the cooling film.

5. The combustor panel of claim 3, wherein the first void is void of cooling holes.

6. The combustor panel of claim 1, wherein the top side is a cold side and the bottom side is a hot side.

7. The combustor panel of claim 1, wherein the second plurality of cooling holes is adjacent a first side of the feature and the third plurality of cooling holes is adjacent a second side of the feature, the feature being between the first plurality of cooling holes and the second plurality of cooling holes.

8. The combustor panel of claim 1, wherein the pentagonal-shaped cross section extends an entire length of each of the first plurality of cooling holes, the second plurality of cooling holes, and the third plurality of cooling holes.

9. A combustor of a gas turbine engine, comprising:
a combustion chamber,
an outer shell disposed around the combustion chamber, and
an inner shell disposed around the combustion chamber and between the combustion chamber and the outer shell, the inner shell including:
a top side facing the outer shell,
a bottom side facing the combustion chamber,
a stud coupled to the top side of the inner shell and extending toward the outer shell, the stud configured to secure the outer shell to the inner shell,
a first plurality of cooling holes disposed adjacent a first side of the stud and extending through the inner shell in a first direction that is rotated about 1° to about 45° counter-clockwise from an axial direction, and
a second plurality of cooling holes disposed adjacent a second side of the stud and extending through the inner shell in a second direction that is rotated about 1° to about 45° clockwise from the axial direction, wherein each of the first plurality of cooling holes and the second plurality of cooling holes has a pentagonal-shaped cross section.

10. The combustor of the gas turbine engine of claim 9, wherein the inner shell further comprises:
a third plurality of cooling holes extending through the inner shell in the axial direction, wherein the first plurality of cooling holes is disposed between the stud and the third plurality of cooling holes, wherein each of the third plurality of cooling holes has the pentagonal-shaped cross section.

11. The combustor of the gas turbine engine of claim 10, wherein the first plurality of cooling holes, the second plurality of cooling holes, and the third plurality of cooling holes are configured to form a cooling film over the bottom side of the inner shell.

12. The combustor of the gas turbine engine of claim 11, wherein the stud defines a space on the bottom side that is void of cooling holes.

13. The combustor of the gas turbine engine of claim 12, wherein the space defines a void in the cooling film formed by airflow through the first plurality of cooling holes, the second plurality of cooling holes, and the third plurality of cooling holes.

14. The combustor of the gas turbine engine of claim 9, wherein each of the first plurality of cooling holes is rotated counter-clockwise from the axial direction by a different amount.

15. The combustor of the gas turbine engine of claim 9, wherein each of the second plurality of cooling holes is rotated clockwise from the axial direction a different amount.

16. A gas turbine engine, comprising:
a fan section,
a compressor section adjacent the fan section, and
a combustor section adjacent the compressor section, the combustor section including:
a combustion chamber,
an outer shell disposed around the combustion chamber, and
an inner shell disposed around the combustion chamber and between the combustion chamber and the outer shell, the inner shell including:
a top side facing the outer shell,
a bottom side facing the combustion chamber,
a stud coupled to the top side of the inner shell and extending toward the outer shell, the stud configured to secure the outer shell to the inner shell,
a first plurality of cooling holes disposed adjacent a first side of the stud and extending through the inner shell in a first direction that is rotated about 1° to about 45° counter-clockwise from an axial direction, and
a second plurality of cooling holes disposed adjacent a second side of the stud and extending through the inner shell in a second direction that is rotated about 1° to about 45° clockwise from the axial direction, wherein each of the first plurality of cooling holes and the second plurality of cooling holes has a pentagonal-shaped cross section.

17. The gas turbine engine of claim 16, wherein the inner shell further comprises:
a third plurality of cooling holes extending through the inner shell in the axial direction, wherein the first plurality of cooling holes is disposed between the stud and the third plurality of cooling holes, wherein each of the third plurality of cooling holes has the pentagonal-shaped cross section.

18. The gas turbine engine of claim 17, wherein the first plurality of cooling holes, the second plurality of cooling holes, and the third plurality of cooling holes are configured to form a cooling film over the bottom side of the inner shell.

19. The gas turbine engine of claim 16, wherein each of the first plurality of cooling holes is rotated counter-clockwise from the axial direction by a different amount.

20. The gas turbine engine of claim 16, wherein each of the second plurality of cooling holes is rotated clockwise from the axial direction a different amount.

* * * * *